(12) United States Patent
Michalscheck et al.

(10) Patent No.: US 9,804,590 B2
(45) Date of Patent: Oct. 31, 2017

(54) SYSTEMS AND METHODS FOR VIRTUALLY TAGGING AND SECURING INDUSTRIAL EQUIPMENT

(71) Applicant: Rockwell Automation Technologies, Inc., Mayfield Heights, OH (US)

(72) Inventors: Jimi R. Michalscheck, Racine, WI (US); Kelly A. Michalscheck, Racine, WI (US); Jessica L. Korpela, Milwaukee, WI (US); Kyle K. Reissner, Hudson, OH (US); David A. Vasko, Hartland, WI (US); John J. Jauquet, Milwaukee, WI (US); Matthew R. Ericsson, Lyndhurst, OH (US); Andrew Wilber, Franklin, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 110 days.

(21) Appl. No.: 14/870,978

(22) Filed: Sep. 30, 2015

(65) Prior Publication Data

US 2016/0284144 A1 Sep. 29, 2016

Related U.S. Application Data

(60) Provisional application No. 62/139,182, filed on Mar. 27, 2015.

(51) Int. Cl.
*G05B 19/41* (2006.01)
*G05B 19/418* (2006.01)
(Continued)

(52) U.S. Cl.
CPC .......... *G05B 19/4185* (2013.01); *F16K 31/00* (2013.01); *F16K 35/00* (2013.01);
(Continued)

(58) Field of Classification Search
CPC .............. G05B 19/4185; G05B 19/042; G05B 19/406; G05B 19/4183; G05B 19/41875; G05B 1/01; G05B 2219/39251; G05B 2219/21147; G05B 2219/31229; G05B 2219/50193; G05B 2219/32368; F16K 3/00; F16K 37/0025; F16K 31/00;
(Continued)

(56) References Cited

U.S. PATENT DOCUMENTS

| 9,487,972 B2 * | 11/2016 | Vetter | E05B 47/0012 |
| 2012/0280783 A1 * | 11/2012 | Gerhardt | G07C 9/00309 340/5.6 |
| 2013/0214903 A1 * | 8/2013 | Kalous | G05B 1/01 340/5.61 |

* cited by examiner

*Primary Examiner* — Ali Neyzari
(74) *Attorney, Agent, or Firm* — Fletcher Yoder, P.C.

(57) ABSTRACT

In one embodiment, a non-transitory computer readable medium may include computer-executable instructions that, when executed by a processor, may receive a first set of data associated with a user, receive a second set of data associated with one or more lockout procedures performed by the user, receive a request to actuate a locking mechanism of an electronic lock configured to prevent a machine in an industrial automation application from being operational, and send a signal to the electronic lock to actuate the locking mechanism when the second set of data indicates that the lockout procedures have been performed by the user and the data corresponds to an authorized user.

22 Claims, 8 Drawing Sheets

(51) Int. Cl.
  *G05B 19/042* (2006.01)
  *G05B 19/406* (2006.01)
  *G07C 9/00* (2006.01)
  *F16K 31/00* (2006.01)
  *F16K 35/00* (2006.01)
  *F16K 37/00* (2006.01)
  *H02J 4/00* (2006.01)
  *G06F 17/18* (2006.01)
  *G07C 3/00* (2006.01)

(52) U.S. Cl.
  CPC ........ *F16K 37/0025* (2013.01); *G05B 19/042* (2013.01); *G05B 19/406* (2013.01); *G05B 19/4183* (2013.01); *G05B 19/4184* (2013.01); *G05B 19/41875* (2013.01); *G06F 17/18* (2013.01); *G07C 3/00* (2013.01); *G07C 9/00111* (2013.01); *G07C 9/00309* (2013.01); *G07C 9/00896* (2013.01); *H02J 4/00* (2013.01); *G05B 2219/21147* (2013.01); *G05B 2219/31229* (2013.01); *G05B 2219/32368* (2013.01); *G05B 2219/39251* (2013.01); *G05B 2219/50193* (2013.01); *Y02P 80/11* (2015.11); *Y02P 80/12* (2015.11); *Y02P 90/02* (2015.11); *Y02P 90/10* (2015.11)

(58) Field of Classification Search
  CPC ..... F16K 35/00; G06F 17/18; G07C 9/00111; G07C 9/00309; G07C 9/00896; H02J 4/00
  USPC ....................................... 340/5.61
  See application file for complete search history.

SYSTEMS AND METHODS FOR VIRTUALLY TAGGING AND SECURING INDUSTRIAL EQUIPMENT

CROSS-REFERENCE TO RELATED APPLICATIONS

This application claims priority from and the benefit of U.S. Provisional Application Ser. No. 62/139,182, entitled "Systems and Methods for Exchanging Information Between Devices in an Industrial Automation Environment," filed Mar. 27, 2015, which is hereby incorporated by reference in its entirety.

BACKGROUND

The present disclosure generally relates to an industrial automation system. More particularly, the present disclosure relates to systems and methods for virtually tagging and securing industrial automation equipment, such as a machine, using an electronic lock when placing the machine offline.

BRIEF DESCRIPTION

In one embodiment, a non-transitory computer readable medium may include computer-executable instructions that, when executed by a processor, may receive a first set of data associated with a user, receive a second set of data associated with one or more lockout procedures performed by the user, receive a request to actuate a locking mechanism of an electronic lock configured to prevent a machine in an industrial automation application from being operational, and send a signal to the electronic lock to actuate the locking mechanism when the second set of data indicates that the lockout procedures have been performed by the user and the data corresponds to an authorized user.

In one embodiment, a system may include an electronic lock including a first processor that may receive an actuation signal, a power source, and a locking mechanism configured to physically lock out a machine from being operational. The system may also include a computing device including a second processor that may send the actuation signal to the electronic lock. The actuation signal may cause the locking mechanism to actuate when one or more access rights associated with the electronic lock correspond to one or more credentials of a user and one or more steps of a lockout-tagout procedure have been performed.

In one embodiment, an electronic lock may physically lock out a machine from being operational. The electronic lock may include a locking mechanism, a processor that may perform an action when the electronic lock is subject to tampering, a transceiver that may receive an actuation signal configured to actuate the locking mechanism and to send data associated with the locking mechanism to a cloud-based computing system, and a memory that may store the data associated with the locking mechanism.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
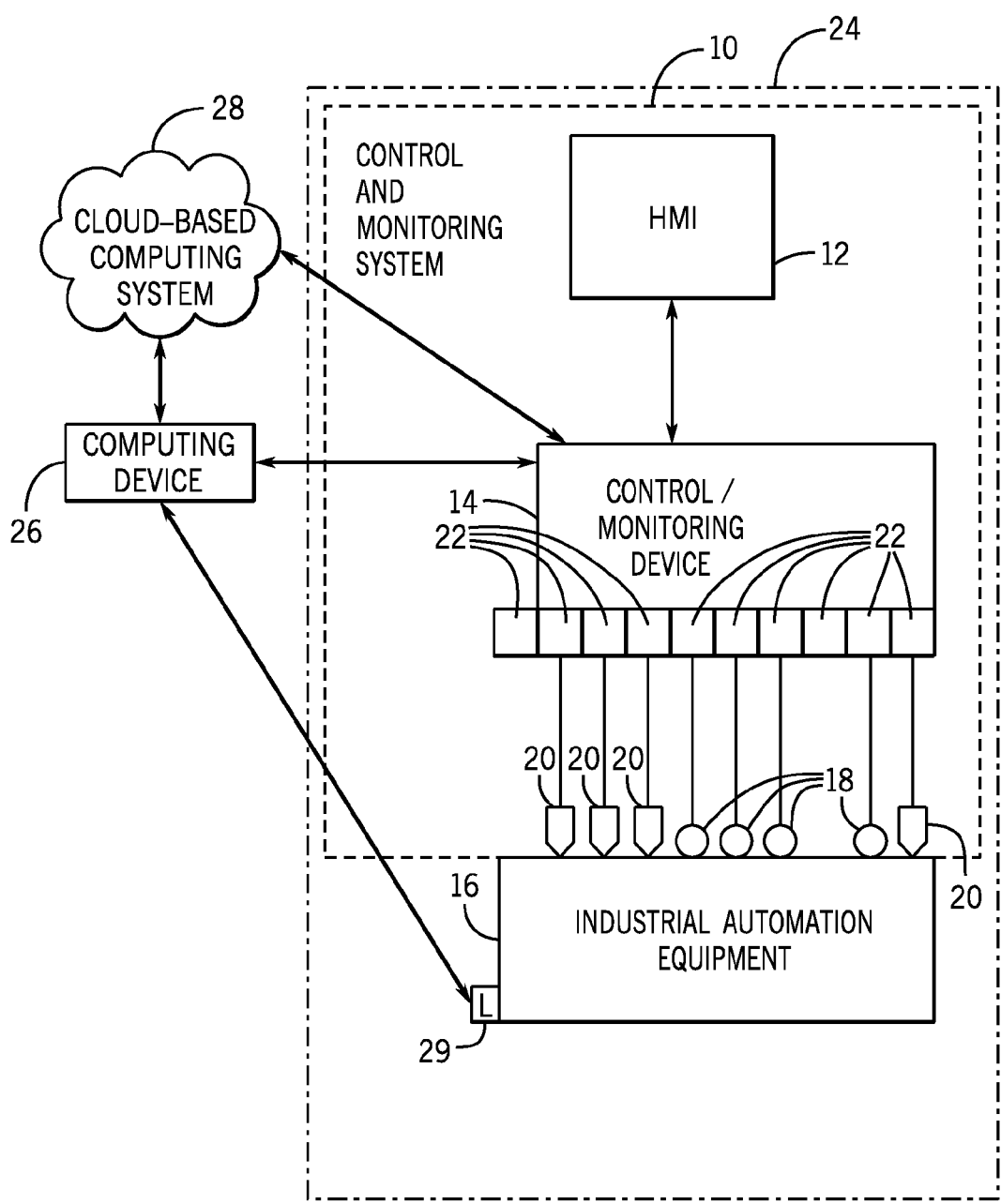
FIG. 1 is a diagrammatical representation of an exemplary control and monitoring system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, the present disclosure discusses numerous concepts regarding how devices in an industrial automation system may exchange information with each other and use this shared information to assist users in the industrial automation environment to manage the operations and maintenance of the devices. In one embodiment, the industrial automation system may include a communication architecture that is structured according to a tri-partite paradigm that facilitates communications between a device, a computing device, and a cloud-based computing system. The information shared between each component within this tri-partite structure may enable various devices within the industrial automation system to operate more efficiently, users to perform tasks related to the conditions or operations of the industrial automation system more efficiently, and generally provide for improved operations of the industrial automation system. In addition, the information shared within the tri-partite structure may include data related to one or more electronic locks used to physically lock out industrial automation equipment, thereby removing the equipment from operation. The information may be related to the location of the electronic lock, actuation command signals, information related to whether certain steps of a procedure (e.g., lockout-tagout procedure) have been performed, alert notifications when the electronic lock is being tampered with, a log of actuation times and users operating the electronic locks, and so forth.

In one embodiment, this tri-partite paradigm may involve a software application operating on the computing device, such that the software application may monitor, control, access, or view industrial automation equipment in the industrial automation system. Further, the software may be used to control actuation of the electronic locks. The computing device may feed data acquired from the industrial automation equipment, control/monitoring device, cloud-based computing system, electronic lock, or the like to the software application used to actuate the electronic locks. The software application may then track and monitor the data to assist the technician with regard to the maintenance and operation of the equipment. Further, the data may be used by the software to control the operation of the equipment of the industrial automation system. In some embodiments, the software application may assist the technician to perform a lockout-tagout procedure, which may detail how to place equipment offline such that the technician can perform maintenance on the respective equipment. Using the data from the electronic locks, the software application may disable certain features related to steps of the lockout-tagout procedure being tracked by the software application when the data indicates certain electronic locks have not been locked.

As discussed herein, lockout-tagout procedures are used throughout various industries and research settings to ensure that machinery and/or processes are placed offline properly and not operating during maintenance or servicing. Generally, a lockout-tagout procedure may include physically locking a part of the machinery in one position (e.g., off) to prevent the part from shifting to an alternate position (e.g., on). The procedure may then involve tagging or placing a label on the device to indicate that the machinery is locked out or is being serviced. It should be noted that, in some embodiments, an electronic version of the tag or label may be included in an electronic lock (e.g., a display (e.g., liquid-crystal display, electronic ink) of the electronic lock may display certain information similar to the tag or label). Typically, the tag may include information such as a statement (e.g., "do not operate—equipment locked out"), an identity of a person who affixed the tag to the device, and/or a timestamp of when the tag is affixed. Also, manual locks may be employed when physically locking the parts of the industrial automation equipment offline. That is, a technician manually actuates the locks to the locked positions.

Certain embodiments of the present disclosure relate to providing electronic locks that may be remotely actuated via an electronic device, such as the computing device (e.g., tablet computer or a mobile device). The electronic locks may request certain credentials and/or status checks for activation. Moreover, the electronic locks may be used for sequential unlock permissions, sequential accessibility (ordering of tasks), user credentials, and the like. As such, the electronic locks may use multi-factor authentication to create a soft virtual lock. For example, an electronic lock may be actuated based on user credentials, as well as based on whether certain procedures have been performed. The procedures may specify that locking out a machine be performed after upstream devices are powered down and certain valves have been depressurized. In this example, the software application may allow an authorized user to actuate the electronic lock after these two steps have been performed. As a result, the software application may require that certain steps are performed prior to a device being placed offline to ensure that when the device is placed offline, the device is placed offline properly. Moreover, the software application may help ensure that the technician is operating safely.

Further, in some embodiments, the electronic locks may include location information or a beacon that may be used to assist the software application operating on the computing device to identify a particular position or location of the electronic lock. Further, the software application may determine directions to the electronic locks from the computing device executing the software application and display the directions on the electronic device. Additional details with regard to the electronic locks described above will be discussed in more detail with reference to FIGS. 1-10 below.

FIG. 1 is a diagrammatical representation of an exemplary control and monitoring system 10, in accordance with embodiments presented herein. In FIG. 1, the control and monitoring system 10 is illustrated as including a human machine interface (HMI) 12 and a control/monitoring device or automation controller 14 adapted to interface with devices that may monitor and control various types of industrial automation equipment 16. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements. Although not depicted in FIG. 1, the control and monitoring system 10 may also include controllers, input/output (I/O) modules, motor control centers, operator interfaces, contactors, starters, drives, relays, network switches (e.g., Ethernet switches, modular-managed, fixed-managed, service-router, industrial, unmanaged, etc.), and the like.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling and other applications.

Additionally, the industrial automation equipment 16 may include various types of equipment that may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include motors, protection devices, switchgear, compressors, and the like.

In certain embodiments, one or more properties of the industrial automation equipment 16 may be monitored and controlled by certain equipment for regulating control variables. For example, sensors 18 and actuators 20 may monitor various properties of the industrial automation equipment 16 and may be involved to adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP®, ControlNet®, DeviceNet®, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller 14). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like.

In certain embodiments, the control/monitoring device 14 may be communicatively coupled to a computing device 26 and a cloud-based computing system 28. In this network, input and output signals generated from the control/monitoring device 14 may be communicated between the computing device 26 and the cloud-based computing system 28. Further, the computing device 26 may be communicatively coupled to the cloud-based computing system 28 and one or more electronic locks 29 that are used to physically lock the industrial automation equipment 16 in a state (e.g., off). For example, the computing device 26 may send a command signal to the electronic lock 29 to actuate and lock the industrial automation equipment 16 according to lockout-tagout procedures associated with respective industrial automation equipment 16.

Figure 2:
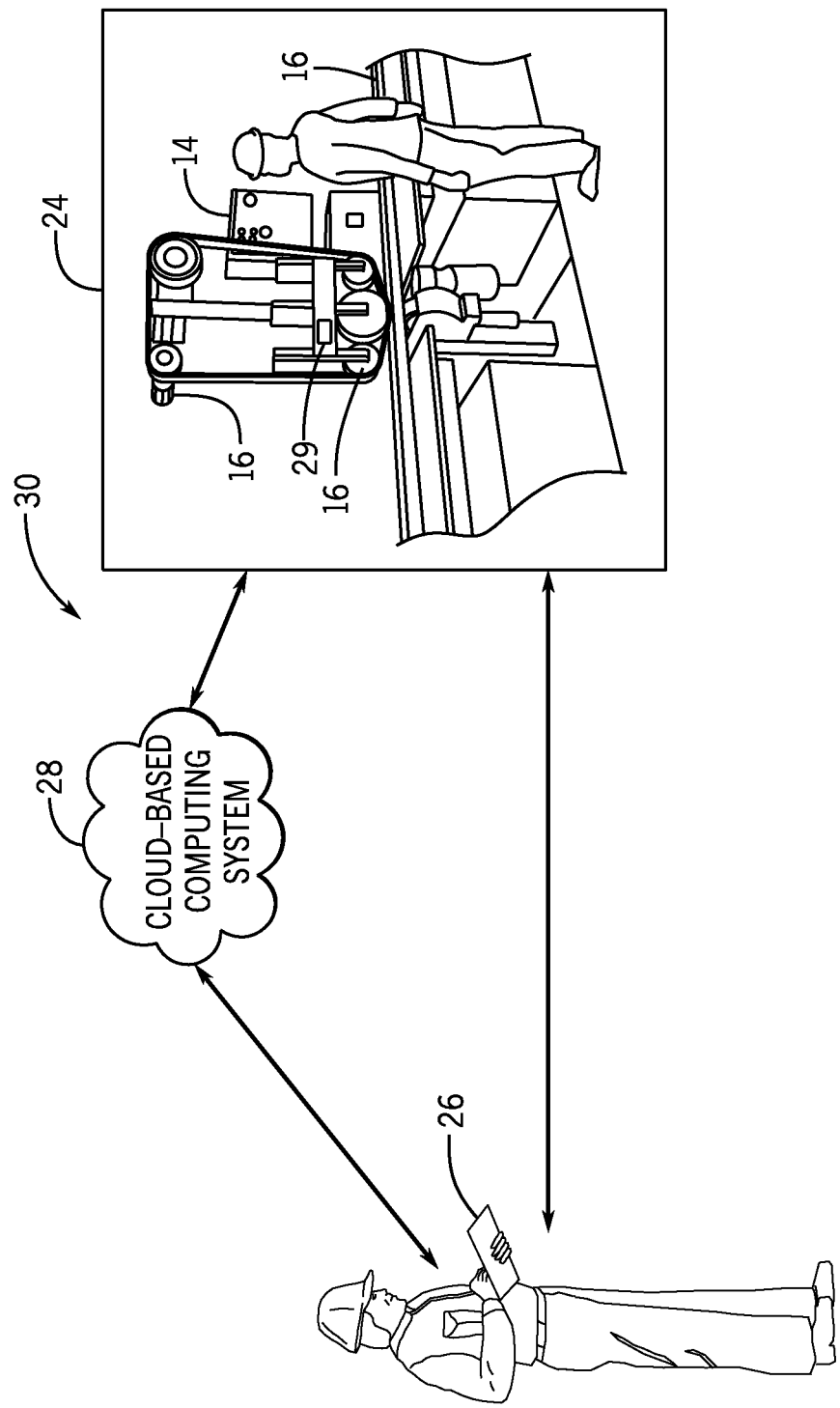
FIG. 2 is a schematic representation of a communication network, in accordance with embodiments presented herein.

FIG. 2 is a schematic representation of a communication network 30 that enables devices to communicate with each other within an industrial application, in accordance with embodiments presented herein. As such, the communication network 30 enables devices that are part of the industrial application 24 to communicate with each other and with other devices that are not part of the industrial application 24. As mentioned above, the industrial application 24 may be in the material handling, packaging industries, manufacturing, processing, batch processing, or any technical field that employs the use of the industrial automation equipment 16. One or more electronic locks 29 may be used to physically lock the industrial automation equipment 16 according to lockout-tagout procedures.

With the foregoing in mind, in one embodiment, data acquired by the industrial automation equipment 16 may be transmitted to a computing device 26. The computing device 26 may be a computing device that may include communication abilities, processing abilities, and the like. For example, the computing device 26 may be any general computing device that may monitor, control, and/or operate one or more of the industrial automation equipment 16. As such, the computing device 26 may be a laptop computer, a tablet computer, a mobile phone device computing device, a general personal computer, a wearable computing device, or the like. Additional details regarding the computing device 26 will be discussed below with reference to FIG. 3.

In addition to communicating with the industrial automation equipment 16, the computing device 26 may also communicate with the cloud-based computing system 28. The cloud-based computing system 28 may be a cloud-accessible platform that may include one or more servers, one or more computing devices (e.g., general purpose computers), and the like. In any case, the cloud-based computing system 28 may include a number of computers that may be connected through a real-time communication network, such as the Internet, Ethernet, EtherNet/IP, ControlNet, or the like, such that the multiple computers may operate together as a single entity. The real-time communication network may include any network that enables various devices to communicate with each other at near real-time or such that data is communicated with each other at near instantaneous speeds. In one embodiment, the cloud-based computing system 28 may be capable of communicating with the industrial automation equipment 16 and the computing device 26. As such, the cloud-based computing system 28 may be capable of wired or wireless communication between the industrial automation equipment 16 and the computing device 26. In one embodiment, the cloud-based computing system 28 may be accessible via the Internet or some other network. In some embodiments, the computing device 26 and the cloud-based computing system may be in communication with the one or more electronic locks 29.

After establishing a communication connection between the computing device 26 and the industrial automation equipment 16 (e.g., via an associated control/monitoring device 14 or computing device of the industrial automation equipment 16), the cloud-based computing system 28 may receive data acquired by the computing device 26 and the industrial automation equipment 16. After receiving this data, in one embodiment, the cloud-based computing system 28 may perform large-scale data analysis operations on the data, such that the operations may be distributed over the computers that make up the cloud-based computing system 28.

In another embodiment, the cloud-based computing system 28 may forward acquired data or analyzed data to different computing devices, various industrial automation equipment, or the like. As such, the cloud-based computing system 28 may maintain a communication connection with various industrial automation equipment 16, computing devices 26, and the like. Additional details regarding the cloud-based computing system 28 will be discussed below with reference to FIG. 4.

Figure 3:
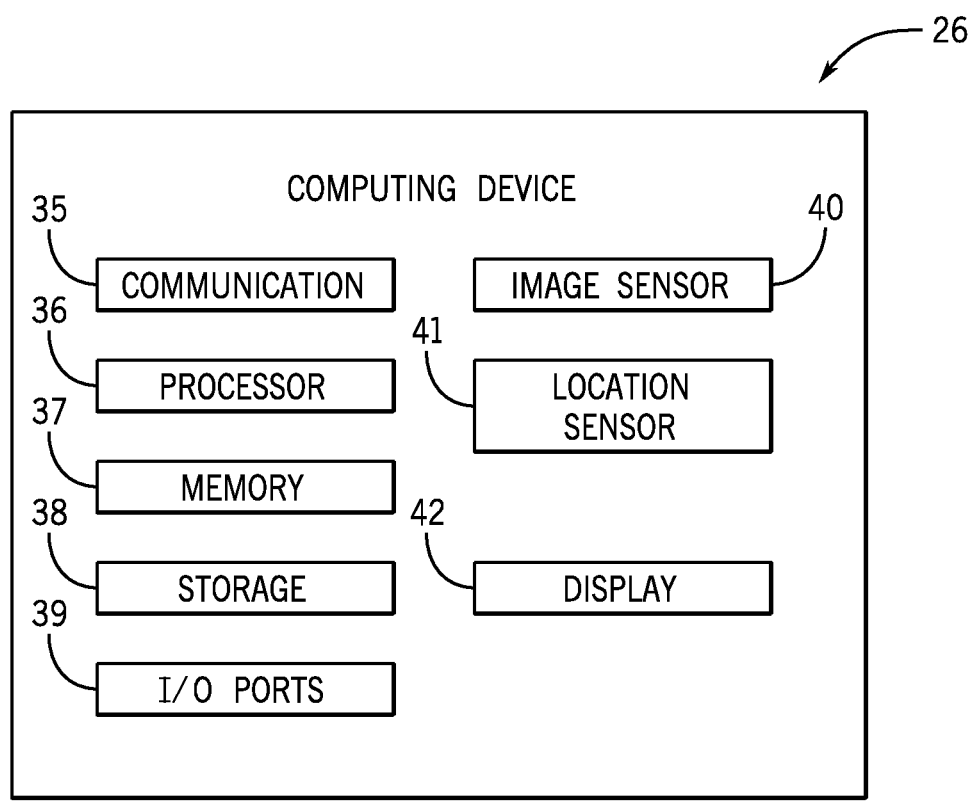
FIG. 3 is a block diagram of example components within a computing device that is part of the communication network of FIG. 2, in accordance with embodiments presented herein.

FIG. 3 is a block diagram of example components within the computing device 26 that is part of the communication network 30 of FIG. 2, in accordance with embodiments presented herein. For example, the computing device 26 may include a communication component 35, a processor 36, a memory 37, a storage 38, input/output (I/O) ports 39, an image sensor 40 (e.g., a camera), a location sensor 41, a display 42, additional sensors (e.g., vibration sensors, temperature sensors), and the like. The communication component 35 may be a wireless or wired communication component that may facilitate communication between the industrial automation equipment 16, the cloud-based computing system 28, electronic locks 29, and other communication capable devices.

The processor 36 may be any type of computer processor or microprocessor capable of executing computer-executable code. The processor 36 may also include multiple processors that may perform the operations described below. The memory 37 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 36 to perform the presently disclosed techniques. Generally, the processor 36 may execute software applications that include programs that enable a user to track and/or monitor operations of the industrial automation equipment 16 via a local or remote communication link. That is, the software applications may communicate with the control/monitoring device 14 and gather information associated with the industrial automation equipment 16 as determined by the control/monitoring device 14, via sensors disposed on the industrial automation equipment 16, and the like.

The memory 37 and the storage 38 may also be used to store the data, analysis of the data, the software applications, and the like. The memory 37 and the storage 38 may represent non-transitory computer-readable media (e.g., any suitable form of memory or storage) that may store the processor-executable code used by the processor 36 to perform various techniques described herein. It should be noted that non-transitory merely indicates that the media is tangible and not a signal.

In one embodiment, the memory 37 and/or storage 38 may include a software application that may be executed by the processor 36 and may be used to monitor, control, access, or view one of the industrial automation equipment 16, as well as control the actuation of the electronic locks 29. As such, the computing device 26 may communicatively couple to industrial automation equipment 16 or to a respective computing device of the industrial automation equipment 16 via a direct connection between the two respective devices or via the cloud-based computing system 28. Also, the computing device 26 may communicatively couple to the electronic locks 29 via a direct connection between the two respective devices or via the cloud-based computing system 28. Additionally, the memory 37 may be used to store the processor executable instructions for determining when to actuate the electronic locks 29. For example, the instructions may specify that credentials of the user are authorized and certain steps of the lockout-tagout procedures are completed prior to sending an actuation signal to the electronic locks 29. In some embodiments, the instructions also may determine the location of the electronic locks 29 based on location information received from the electronic locks 29, among other things.

The I/O ports 39 may be interfaces that may couple to other peripheral components such as input devices (e.g., keyboard, mouse), sensors, input/output (I/O) modules, and the like. I/O modules may enable the computing device 26 to communicate with the industrial automation equipment 16 or other devices in the industrial automation system via the I/O modules.

The image sensor 40 may include any image acquisition circuitry such as a digital camera capable of acquiring digital images, digital videos, or the like. The location sensor 41 may include circuitry designed to determine a physical location of the computing device 26. In one embodiment, the location sensor 41 may include a global positioning system (GPS) sensor that acquires GPS coordinates for the computing device 26. In another embodiment, the location sensor 41 may include other circuitry such as a radio wave transmitter, an infrared sensor, and the like that may acquire data that may be used to determine a location of the computing device 26 with respect to other industrial automation equipment 16 or other fixtures in the industrial automation system. In certain embodiments, the computing device 26 may also include various other sensors that may provide additional data related to an environment in which the computing device 26 exists. For instance, the other sensors may include an accelerometer, a gas (e.g., smoke, carbon monoxide) sensor, or the like.

The display 42 may depict visualizations associated with software or executable code being processed by the processor 36. In one embodiment, the display 42 may be a touch display capable of receiving inputs from a user of the computing device 26. As such, the display 42 may serve as a user interface to communicate with the industrial automation equipment 16. The display 42 may be used to display a graphical user interface (GUI) for operating the industrial automation equipment 16, for tracking the maintenance of the industrial automation equipment 16, performing various procedures (e.g., lockout-tagout, placing device offline, replacing component, servicing device) for the industrial automation equipment 16, and the like. Also, the display 42 may display the location and/or position of the electronic lock 29 and may display navigational directions to the electronic lock 29. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the industrial equipment 16. In some embodiments, the operator interface may be characterized as the HMI 12, a human-interface machine, or the like.

Although the components described above have been discussed with regard to the computing device 26, it should be noted that similar components may make up the control/monitoring device 14. Moreover, the computing device 26 may also be part of the industrial automation equipment 16, and thus may monitor and control certain operations of the industrial automation equipment 16. Further, it should be noted that the listed components are provided as example components and the embodiments described herein are not to be limited to the components described with reference to FIG. 3.

Figure 4:
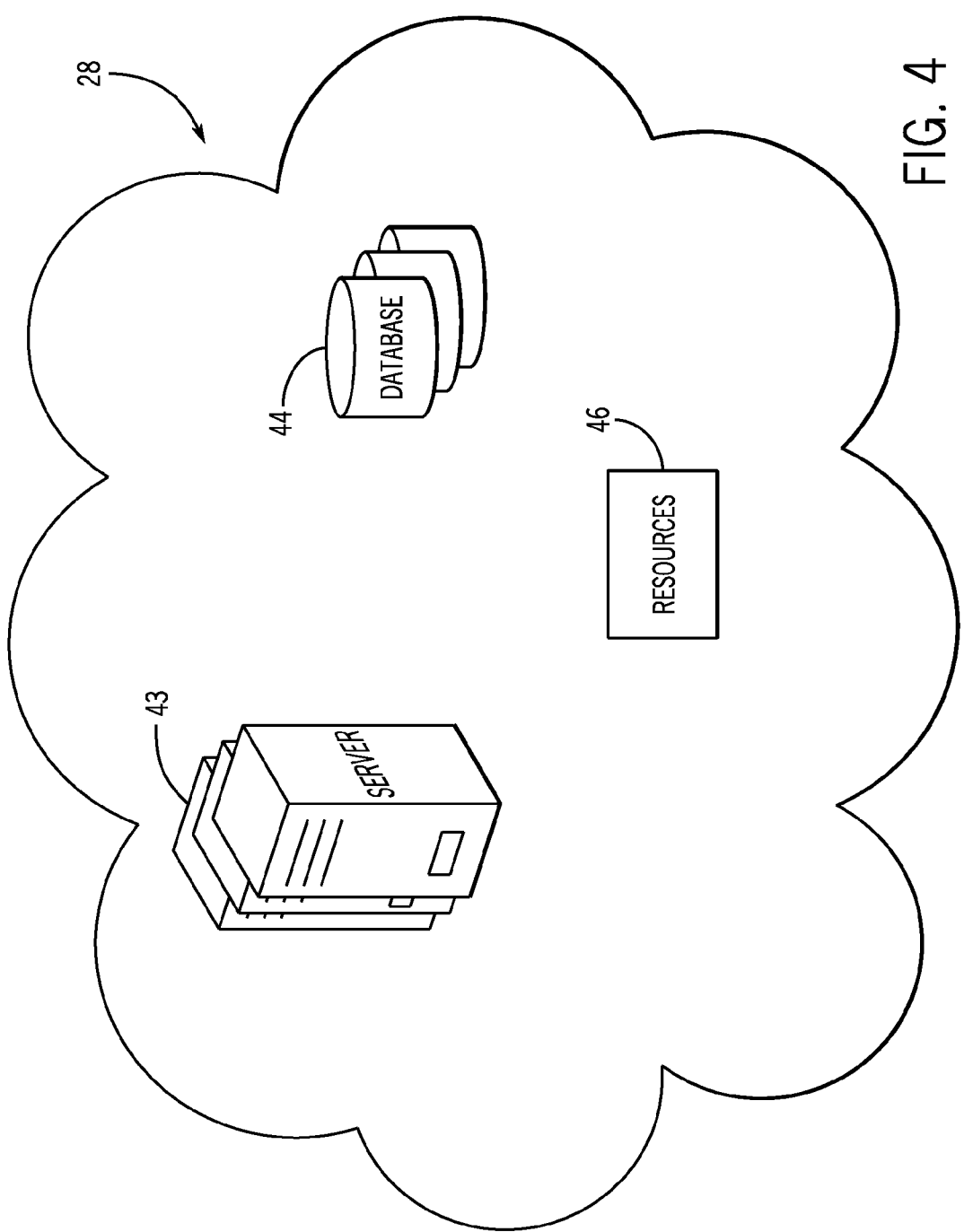
FIG. 4 is a block diagram of example components within a cloud-based computing system of the communication network of FIG. 2, in accordance with embodiments presented herein.

FIG. 4 is a block diagram of example components within the cloud-based computing system 28 of the communication network 30 of FIG. 2, in accordance with embodiments presented herein. As mentioned above, the cloud-based computing system 28 may include a number of computing devices, such as servers 43 that may be communicatively coupled to each other and may distribute various tasks between each other to perform the tasks more efficiently. In certain embodiments, each server 43 may include the example components described above as part of the computing device 26 in FIG. 3.

The cloud-based computing system 28 may also have access to a number of databases 44. The databases 44 may be related to various aspects of the industrial automation system, the industrial automation equipment 16, the computing device 26, operators of the computing device 26 or the industrial automation equipment 16, or the like. For example, the databases 44 may include information regarding procedures for operating and/or maintaining the industrial automation equipment 16. The procedures, as such, may include steps to perform, tools to use, personal protective equipment to wear, and the like with regard to the operations being performed.

The databases 44 may also include information regarding various regulations related to how the industrial automation equipment 16 should be maintained or operated. Additionally, the regulations may be related to how maintenance operations should be documented by the user of the computing device 26. The databases 44 may also include data related to warranty information for the industrial automation equipment 16, service contact information related to the industrial automation equipment 16, manuals for operating the industrial automation equipment 16, and other information that may be useful to an operator of the industrial automation equipment 16.

In certain embodiments, the cloud-based computing system 28 may also include access to various resources 46. The resources 46 may be a resource database or collection of published documents or webpages that may be related to the industrial automation equipment 16. As such, the resources 46 may be accessed by the cloud-based computing system 28 available via the Internet or other communication networks. The cloud-based computing system 28 may search or consult the resources 46 to acquire data related to the industrial automation equipment 16. For instance, the resources 46 may provide information regarding product recalls or safety concerns related to the industrial automation equipment 16, weather advisory notices for the industrial automation system, and the like. Additionally, the resources 46 may include hardware, software or firmware updates, software patches, vulnerability patches, certificates, and the like.

Figure 5:
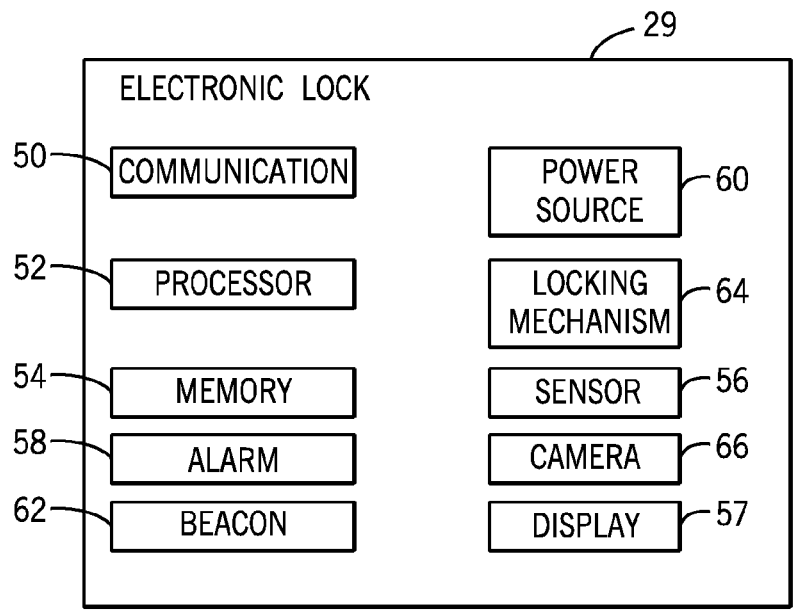
FIG. 5 is a block diagram of example components of an electronic lock, in accordance with embodiments presented herein.

FIG. 5 is a block diagram of example components of the electronic lock 29, in accordance with embodiments presented herein. It should be noted, that the electronic lock 29 may include several similar components as the computing device 26. For example, the electronic lock 29 may include a lock communication component 50, a lock processor 52, a lock memory 54, a lock sensor 56, and a lock display 57. The lock communication component 50 may facilitate communicatively coupling to the computing device 26, the cloud-based computing system 28, and/or the control/monitoring device 14. The lock communication component 50 may be programmed to communicate over any suitable wired and/or wireless network, such as Ethernet, WiFi, Bluetooth® Low Energy (BLE), ZigBee®, and so forth. In some embodiments, the lock communication component 50 includes a transceiver enabled to receive and transmit data.

The lock processor 52 may be any type of computer processor or microprocessor capable of executing computer-executable code. The lock processor 52 may also include multiple processors that may perform the operations described below. The lock memory 54 may be any suitable articles of manufacture that can serve as media to store processor-executable code, data, or the like. These articles of manufacture may represent computer-readable media (e.g., any suitable form of memory or storage) that may store the processor-executable code used by the lock processor 52 to perform the presently disclosed techniques. The lock memory 54 may also be used to store the data, analysis of the data, the software applications, and the like. The lock memory 54 may represent non-transitory computer-readable media (e.g., any suitable form of memory or storage) that may store the processor-executable code used by the lock processor 52 to perform various techniques described herein. It should be noted that non-transitory merely indicates that the media is tangible and not a signal. Generally, the lock processor 52 may execute a software application that maintains a record of times in which the electronic lock 29 is opened and/or closed, identifies a person or user who may have operated the electronic lock 29, perform one or more preventative actions (e.g., send alert or send signals to shut down the industrial automation equipment 16) when the electronic lock 29 is being tampered with, and the like.

The lock sensor 56 may be used to detect users that are operating the electronic lock 29 and/or are in the area where the industrial automation equipment 16 is located. The lock sensor 56 may include a receiver circuit (e.g., radio-frequency identification (RFID) reader) that reads or detects a signal from a transmitter circuit (e.g., RFID tag) in an access badge. The lock sensor 56 may be communicatively coupled to the lock processor 52 and send signals to the lock processor 52. The lock processor 52 may determine the identity of the user based on the signals and log the users that access the electronic lock 29 and/or the area including the industrial automation equipment 16. In some embodiments, the lock sensor 56 may include a vibration sensor enabled to detect vibrations or a level sensor to detect angle, which the lock processor 52 may use to determine whether the electronic lock 29 is being tampered with. For example, the lock processor 52 may have a range of expected vibration or level data associated with normal contact of the electronic lock 29. When the lock processor 52 receives vibration data that exceeds the range, the lock processor 52 may determine that the electronic lock 29 is being tampered with.

In some embodiments, the electronic lock 29 may also include the lock display 57. The lock display 57 may include liquid crystals (e.g., a liquid-crystal display (LCD)), light emitting diodes (LEDs), or electronic ink). In some embodiments, electronic ink may be used to preserve display during absence of an energy level of the power source 60. The lock display 57 may display any suitable information stored in the lock memory 54 and/or obtained from the computing device 26 and/or the cloud-based computing system 28. For example, the lock display 57 may display certain information related to tagging the industrial automation equipment 16 after the equipment is locked out. That is, the lock display 57 may display an identity of a technician that locked the electronic lock 29, a message (e.g., a warning not to unlock or tamper with the electronic lock 29), and a timestamp of when the technician locked the electronic lock 29. Further, in some embodiments, the lock display 57 may display a history of the timestamps at which the electronic lock 29 was locked and unlocked as well as the identity of the technician who locked and unlocked the electronic lock 29. As may be appreciated, a physical tag or label may not be used in an embodiment where the electronic lock 29 uses the lock display 57 to display the tagging information. However, in some embodiments, a physical tag or label may be used in conjunction with the lock display 57 to display the tagging information.

In some embodiments, the electronic lock 29 may also include an alarm 58 that is controlled by the lock processor 52. The alarm 58 may include a speaker to emit an audible noise that may be used to indicate when energy of a power source 60 is below a threshold. Additionally, the alarm 58 may emit the noise when the electronic lock 29 is being tampered with. In some embodiments, tampering may refer to the electronic lock 29 being moved in an unexpected way, being disturbed, experiencing an unexpected change in temperature, being unable to communicate with other devices, and so forth. In some embodiments, the alarm 58 may include a light source enabled to display a certain light color depending on the severity of the alarm-triggering event. The light source may include a light-emitting diode (LED), a laser, or the like.

In some embodiments, the power source 60 may store a charge and provide power for the electronic lock 29. The power source 60 may include a pre-charged battery that is replaceable when the stored power is depleted or a rechargeable battery that can be recharged using another source of power. In some embodiments, the power source 60 may include any suitable number of batteries and combination of types of batteries (e.g., pre-charged or rechargeable). Further, in some embodiments, the power source 60 may include an energy-harvesting device that collects energy from its environment. The energy-harvesting device may use various energy harvesting techniques that turn ambient light, heat, movement, and so forth into energy to charge the power source 60. For example, the energy-harvesting device may include a piezoelectric material that enables converting kinetic energy (e.g., from vibration of industrial automation equipment 16) into electrical energy that can be stored by the power source 60. The energy-harvesting device may also include a thermoelectric energy harvesting device and/or an ambient light-harvesting device. A thermoelectric energy-harvesting device may generate electricity in the presence of temperature differences between substrate layers. Additionally, the power source 60 may include a continuous source of alternating current (AC) power.

In some embodiments, the electronic lock 29 may include a beacon 62 (e.g., Bluetooth® Low Energy) that may send location information regarding the electronic lock 29 to the computing device 26 and/or any communicatively connected device. The beacon 62 may include electronic circuitry that is capable of broadcasting a signal including the location information, position information, proximity to other devices information, or some combination thereof. The signal may be received by other electronic devices listening at a certain frequency. In some embodiments, the electronic circuitry of the beacon 62 may be capable of sending the signal directly to devices that are connected to the beacon 62. The software application operating on the computing device 26 may use the location information to identify a particular position and/or location of the electronic lock 29. For example, in some embodiments, the beacon 62 may emit coordinates to its location (e.g., a unique identifier indicative of physical location of the beacon 62), the location of the electronic lock 29, and/or the location of the industrial automation equipment 16. In one embodiment, the lock processor 52 may use triangulation schemes to assist the computing device 26 in determining directions to the electronic lock 29 or the industrial automation equipment 16. Triangulation schemes may include determining the location of the electronic lock 29 or the industrial automation equipment 16 by measuring the angles to the electronic lock 29 or the industrial automation equipment 16 from known points at the ends of a fixed baseline (e.g., a wall of a facility, a line between two other known points (other industrial automation equipment in the facility)). In some embodiments, emitters may be strategically placed in the facility for the purpose of finding the location of the electronic lock 29 or the industrial automation equipment 16 by broadcasting the location of the emitters for devices (e.g., computing device 26) to read. The location of the electronic lock 29 or the industrial automation equipment 16 can be fixed as the third point of a triangle based on known locations, such as the locations of the emitters. As described below, the location of the electronic device 29 may enable the computing device 26 to determine navigational directions to the electronic lock 29 based on the signal provided by the beacon 62.

In some embodiments, the electronic lock 29 may include a locking mechanism 64. The locking mechanism 64 may include mechanical components that are moved via actuators controlled by the lock processor 52. For example, one such locking mechanism 64 may include a magnet and an adjustable cable. The lock processor 52 may send signals to the power source 60 to supply current to the magnet so a magnetic field is generated that either attracts or repels the adjustable cable, which may be made of a ferromagnetic material (e.g., metal, iron, or nickel), depending on whether the lock processor 52 is locking or unlocking the electronic lock 29.

In some embodiments, the locking mechanism 64 may include gears that move the adjustable cable. In some embodiments, the gears may turn in response to a magnetic field generated by the magnet. Additionally, the locking mechanism 64 may include a motor that moves the gears, which in turn move the adjustable cable. In some embodiments, the motor may be powered by the power source 60 of the locking mechanism 64.

In some embodiments, the electronic lock 29 may include a camera 66. The camera 66 may be used to capture image/video data and send the image/video data to the lock processor 52 for analysis. The lock processor 52 may use facial recognition techniques while analyzing the image/video data to determine the identity of the user in the image/video data and then log the identity of the user that is identified and the date/time that the user was identified. As discussed above, the identity of the user may be logged if the user is determined to be accessing the electronic lock 29 and/or the area including the industrial automation equipment 16.

Although the components described above have been discussed with regard to the electronic lock 29 that is separate from the industrial automation equipment 16, it should be noted that the electronic lock 29 may be integrated in the industrial automation equipment 16 and may be part of the industrial automation equipment 16. In such an embodiment, the integral electronic lock 29 may include similar components described above. Further, it should be noted that the listed components are provided as example components and the embodiments described herein are not to be limited to the components described with reference to FIG. 5.

Figure 6:
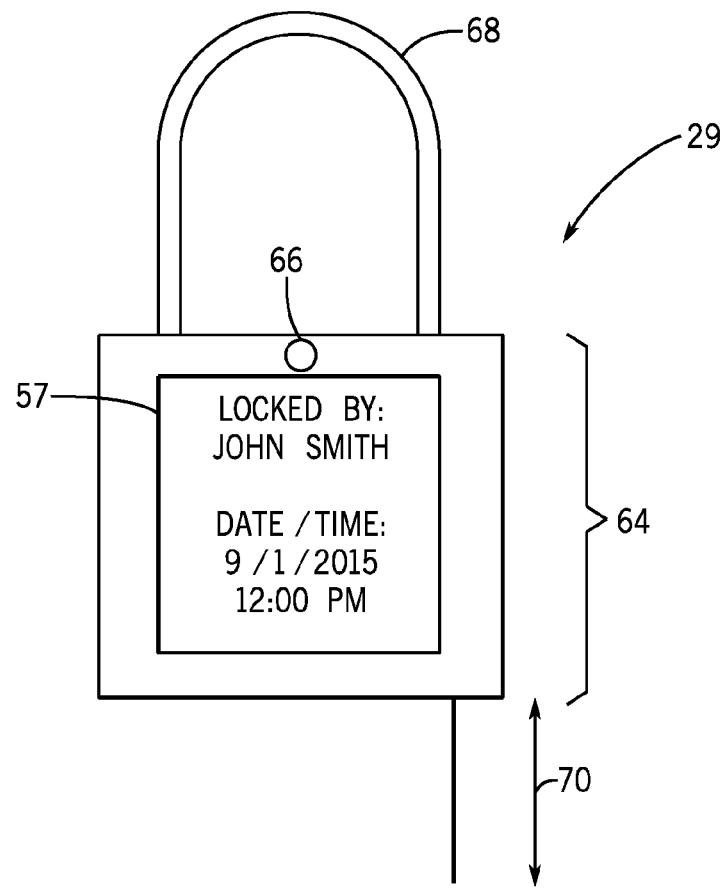
FIG. 6 is a diagrammatical representation of an electronic lock, in accordance with embodiments presented herein.

FIG. 6 is a diagrammatical representation of an electronic lock, in accordance with embodiments presented herein. As depicted, the electronic lock 29 includes the locking mechanism 64. The locking mechanism 64 may include an adjustable cable 68 made of a ferromagnetic material and a magnet internal to the electronic lock. As shown by arrow 70, the adjustable cable 68 may move up and down to unlock and lock the electronic lock 29. That is, the magnet is used to pull the adjustable cable 68 down to a locked position and to push the adjustable cable 68 up to an unlocked position. As previously discussed, the lock processor 52 may instruct the power source 60 to supply current to the magnet to generate a magnetic field to either attract or repel the adjustable cable 68.

Additionally, as mentioned above, in some embodiments, the locking mechanism 64 may include gears and a small motor coupled to at least one of the gears via a shaft. When the small motor is activated, the shaft may rotate, thereby causing the gears to rotate. Depending on the direction of rotation, the gears may pull the adjustable cable 68 down to the locked position or push the adjustable cable 68 up to the unlocked position. In yet another embodiment, the locking mechanism 64 may include the magnet, gears, and the adjustable cable. The magnetic field generated by the supplied current may cause the gears to rotate in a desired direction, thereby moving the adjustable cable 68.

In some embodiments, the electronic lock 29 may include the lock display 57, which may display certain information related to tagging the industrial automation equipment 16 after the electronic lock 29 has been locked. As depicted, the lock display 57 shows the technician responsible for locking the electronic lock 29 (e.g., "John Smith") and the timestamp that the technician locked the electronic lock 29 (e.g., Sep. 1, 2015 12:00 PM). It should be understood that the displayed information is illustrative only and not meant to limit the scope of information presented by the lock display 57. For example, the lock display 57 may display a message, such as a warning not to unlock or tamper with the electronic lock 29. Additionally, the lock display 57 may display a history of timestamps when the electronic lock 29 was locked and/or unlocked, as well as the technician responsible for locking and/or unlocking the electronic lock 29. In some embodiments, the lock display 57 may display a reason why the electronic lock 29 was locked. In some embodiments, the lock display 57 may display an alert when certain events occur (e.g., when the electronic lock 29 is being tampered with). The alert may include changing the font color (e.g., red), changing font size, changing background color, and so forth.

As discussed above, the camera 66 may be used to capture image/video data. As depicted, the camera 66 may be located on a front panel of the electronic lock 29 in proximity to the lock display 57. However, it should be noted that the camera 66 and the lock display 57 may be arranged in any suitable location on the electronic lock 29. In some embodiments, the camera 66 may be used to capture image/video data when a user is locking and/or unlocking the electronic lock 29 (e.g., via the computing device 26). For example, the image/video data may be sent to the lock processor 52, which may use facial recognition techniques while analyzing the image/video data to determine the identity of the user in the image/video data and then log the identity of the user that is identified and the date/time that the user was identified. As discussed above, the identity of the user may be logged if the user is determined to be accessing the electronic lock 29 and/or the area including the industrial automation equipment 16.

Figure 7:
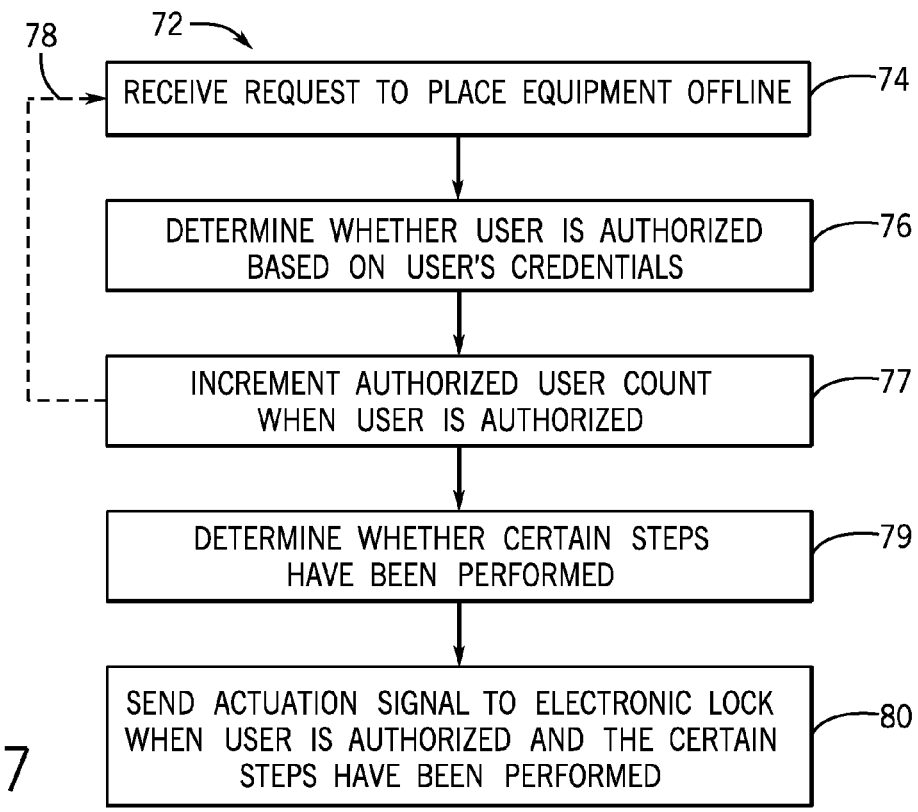
FIG. 7 is a flow diagram of a method for controlling actuation of the electronic lock of FIG. 6, in accordance with embodiments presented herein.

In some embodiments, more than one user may request to actuate (e.g., lock) the electronic lock 29. In some embodiments, the electronic lock 29 may be locked after a first authorized user requests to lock the electronic lock 29 (e.g., using a computing device 26). Then, when additional authorized users request to actuate the electronic lock 29 (e.g., using a computing device 26) and the electronic lock 29 is already actuated, an authorized user count may be incremented. In some embodiments, the authorized user count may be maintained by the processor 36 of the computing device 26 or the lock processor 52 of the electronic lock 29. Also, the processor 36 and/or the lock processor 52 may keep track of the identities of the users that request to lock the electronic lock 29 and the timestamps the electronic lock 29 is locked. In some embodiments, the authorized user count may be displayed on the lock FIG. 7 is a flow diagram of a method 72 for controlling actuation of the electronic lock 29 of FIG. 6, in accordance with embodiments presented herein. Although the following description of the method 72 is described as being performed by the processor 36 of the computing device 26, it should be noted that the method 72 may be performed by other processors disposed on other devices that may be capable of communicating with the electronic lock 29, such as the cloud-based computing system 28, the industrial automation equipment 16, the control/monitoring device 14, or other components associated with the industrial application 24. In some embodiments, the method 72 may be performed by the processor 52 of the electronic lock 29. Additionally, although the following method 72 describes a number of operations that may be performed, it should be noted that the method 72 may be performed in a variety of suitable orders and all of the operations may not be performed. It should be appreciated that the method 72 may be wholly executed by the computing device 26 or the execution may be distributed between the computing device 26 and/or the cloud-based computing system 28.

Referring now to the method 72, the processor 36 may receive (block 74) a request to place the industrial automation equipment 16 offline according to the lockout-tagout procedures. The request may be received as input from the user, as a signal from the industrial automation equipment 16, the electronic lock 29, the control/monitoring device 14, the cloud-based computing system 28, other industrial automation equipment located in the facility, or the like. The processor 36 may determine (block 76) whether the user associated with the request is authorized to place the industrial automation equipment 16 offline based on credentials of the user. For example, the processor 36 may prompt the user to enter an employee identification number, a username, or the like and an associated password, and then verify the credentials in a database to determine the access rights associated with the credentials. In some embodiments, the processor 36 may use single sign-on (SSO) and already possess the credentials from when the user entered them by initially logging into the software. Also, the processor 36 may have remembered the credentials of the user, thereby skipping over prompting the user for the credentials. If the credentials of the user do not have sufficient access rights to place the industrial automation equipment 16 offline, then the processor 36 may deny the request. Additionally, the processor 36 may disable certain features of the lockout-tagout procedures being displayed on the display 42 that are tied to the missing access rights by graying the procedures out and making their icons/buttons inoperable, removing procedures from the graphical user interface (GUI), or the like.

The processor 36 may also determine (block 78) whether certain steps of a procedure (e.g., lockout-tagout) have been performed. That is, in some embodiments, the lockout-tagout procedures may specify that certain steps are completed prior to physically locking the industrial automation equipment 16. For example, locking out a machine may be specified as being performed after upstream devices are powered down and certain valves have been depressurized. When the user is authorized and/or when the certain steps have been performed, the processor 36 may send (block 80) an actuation signal to the electronic lock 29 to lock. In the above example, the processor 36 may send the actuation signal to the electronic lock 29 when the upstream devices are powered down and the certain valves are depressurized and the user is authorized. However, when the upstream devices are not powered down, the certain valves are not depressurized, or the user is not authorized, the processor 36 may not send the actuation signal to the electronic lock 29. In this way, the electronic lock 29 may be used for sequential unlock permissions, sequential accessibility (ordering of tasks), user credentials, and the like. As such, the electronic lock 29 may use multi-factor authentication to create a soft virtual lock.

In some embodiments, the processor 36 determines whether the steps have been performed (e.g., upstream devices are powered down and/or the valves are depressurized) in a number of ways. For example, the processor 36 may receive data input by the technician using a touchscreen display 42 or other input peripheral of the computing device 26 that indicates completion of the steps (e.g., powering down the upstream devices and/or depressurizing the valves). In another example, the processor 36 may determine that the steps are performed when a confirmation is received that indicates the upstream devices are powered down or the valves are depressurized. For example, voltage meters on a voltage bus may determine that the upstream devices are powered down, and the voltage meters may send a confirmation message indicating the same to the processor 36. Also, a controller that controls the upstream devices may determine that the upstream devices are powered down, and the controller may send a confirmation message indicating the same to the processor 36. In addition, pressure sensors monitoring the valves may detect that the valves are depressurized and send a confirmation message indicating the same to the processor 36. In some embodiments, the data related to whether the steps (e.g., upstream systems are powered down and/or the valves are depressurized) are complete may be communicated to the cloud-based computing system 28 by the processor 36, the voltage meter, the controller, the pressure sensor, and so forth. The processor 36 may receive the data related to completion of the steps (e.g., powering down of upstream devices and/or depressurization of valves) from the cloud-based computing system 28. It should be noted that, in some embodiments, the processor 52 of the electronic lock 29 may receive the data related to whether the steps are performed from the cloud-based computing system 28 and/or the individual components (e.g., the processor 36 of the computing device 26, the voltage meter, the controller, the pressure sensor) that send the data to the processor 36, as described above.

Figure 8:
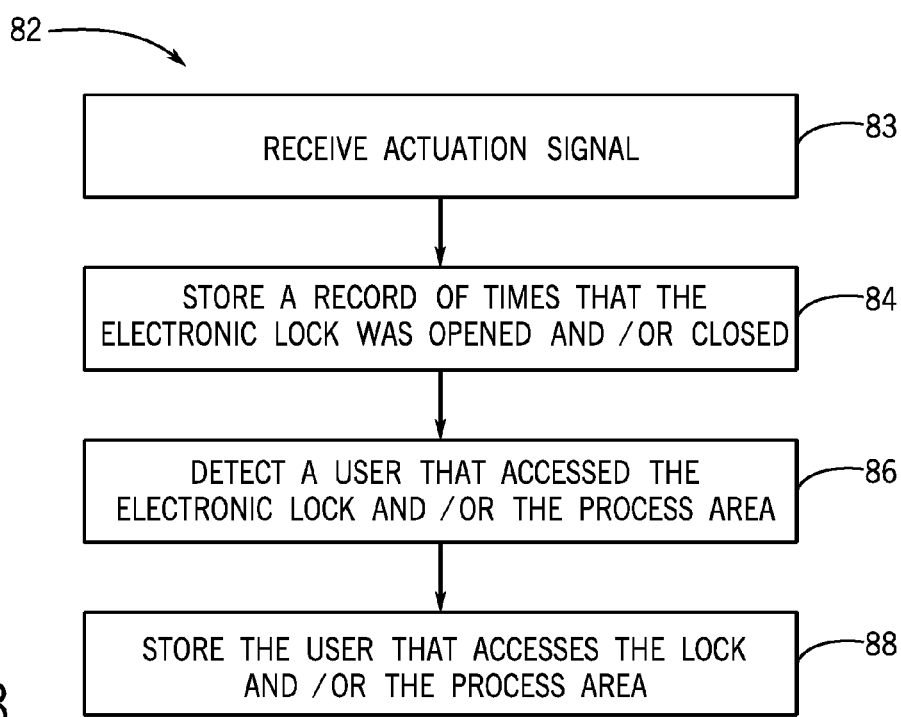
FIG. 8 is a flow diagram of a method for logging information related to operation of the electronic lock, in accordance with embodiments presented herein.

FIG. 8 is a flow diagram of a method 82 for logging information related to operation of the electronic lock 29, in accordance with embodiments presented herein. Although the following description of the method 82 is described with reference to the processor 52 of the electronic lock 29, it should be noted that the method 82 may be performed by other processors disposed on other devices that may be capable of communicating with the electronic lock 29, such as the computing device 26, the cloud-based computing system 28, the industrial automation equipment 16, the control/monitoring device 14, or other components associated with the industrial application 24. Additionally, although the following method 82 describes a number of operations that may be performed, it should be noted that the method 82 may be performed in a variety of suitable orders and all of the operations may not be performed. It should be appreciated that the method 82 may be wholly executed by the processor 52 of the electronic lock 29 or the execution may be distributed between the processor 52 of the electronic lock 29 and/or the processor 36 of the computing device 26.

Referring now to the method 82, the processor 52 may receive (block 83) an actuation signal to lock or unlock. The actuation signal may be received from the computing device 26, the cloud-based computing system 28, the control/monitoring device 14, or the like. The processor 52 may store (block 84) a record of times that the electronic lock 29 is opened (e.g., unlocked) and closed (e.g., locked) in the memory 54. The times may enable tracking whether there are certain times of the day that the electronic lock 29 is locked more often than other times, which may indicate trends and enable troubleshooting by focusing attention on those times. The processor 52 may also detect (block 86) a user that accessed the electronic lock 29 and/or the area of the facility including the industrial automation equipment 16. As described above, the user may be detected by using the sensor 56 and/or the camera 66 and the processor 52 may determine the identity of the user. The processor 52 may also store (block 88) the identity of the user that access the electronic lock 29 and/or the area of the facility including the industrial automation equipment 16. As such, the processor 52 virtually tags the electronic lock 29 by storing the user that is responsible for locking the lock 29 and the time at which the lock 29 was locked. The identified user may be indicated on the display 57. Storing or displaying this information may avoid use of traditional physical tags. The computing device 26 can contact the electronic lock 29 at any time and request the tagged information to determine who locked the electronic lock 29 and when the person locked the lock 29. Storing (block 88) information regarding the user that accesses the lock 29 and/or the area of the facility including the industrial automation equipment 16 may also include sending the identity of the user responsible for locking the lock 29 and the time at which the lock 29 was locked to the cloud-based computing system 28 for storage. In some embodiments, any computing device 26 in communication with the cloud-based computing system 28 may receive the stored information from the cloud-based computing system 28 to view as virtual tags on respective industrial automation equipment 16 located in the facility in a visualization depicted on the display 42.

Figure 9:
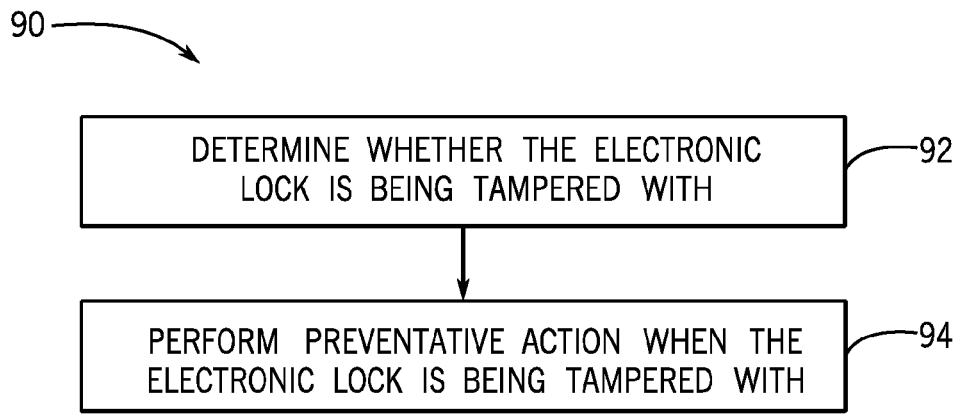
FIG. 9 is a flow diagram of a method for performing a preventative action based on whether the electronic lock of FIG. 6 is being tampered with, in accordance with embodiments presented herein.

FIG. 9 is a flow diagram of a method 90 for performing a preventative action based on whether the electronic lock 29 of FIG. 6 is being tampered with, in accordance with embodiments presented herein. Although the following description of the method 90 is described with reference to the processor 52 of the electronic lock 29, it should be noted that the method 90 may be performed by other processors disposed on other devices that may be capable of communicating with the electronic lock 29, such as the computing device 26, the cloud-based computing system 28, the industrial automation equipment 16, the control/monitoring device 14, or other components associated with the industrial application 24. Additionally, although the following method 90 describes a number of operations that may be performed, it should be noted that the method 90 may be performed in a variety of suitable orders and all of the operations may not be performed. It should be appreciated that the method 90 may be wholly executed by the electronic lock 29 or the execution may be distributed between the electronic lock 29 and/or the computing device 26.

Referring now to the method 90, the processor 52 may determine (block 92) whether the electronic lock 26 is being tampered with. That is, the processor 52 may receive signals from the sensor 56 that are indicative of tampering. For example, one sensor 56 may include a temperature sensor and may send signals to the processor 52 that indicate the electronic lock 29 increasing or decreasing in temperature at a rate above some threshold. In another example, the sensor 56 may include a vibration sensor that provides signals indicating that the electronic lock 29 is vibrating greater than some threshold. Further, the image/video data obtained by the camera 66 may be used by the processor 52 to determine that the electronic lock 29 is being tampered with. The processor 52 may perform (block 94) one or more preventative actions when the processor 52 determines that the electronic lock 29 is being tampered with. The preventative actions may include the processor 52 triggering the alarm 58 to emit an audible noise and/or colored light, sending an alert notification to an appropriate device (e.g., the computing device 26, the cloud-based computing system 28, and/or the control/monitoring device 28), sending command signals to shut down the industrial automation equipment 16 or any other equipment in the facility, logging the identity of the user identified in the image/video data captured by the camera 66 or read by the RFID reader, and so forth.

Figure 10:
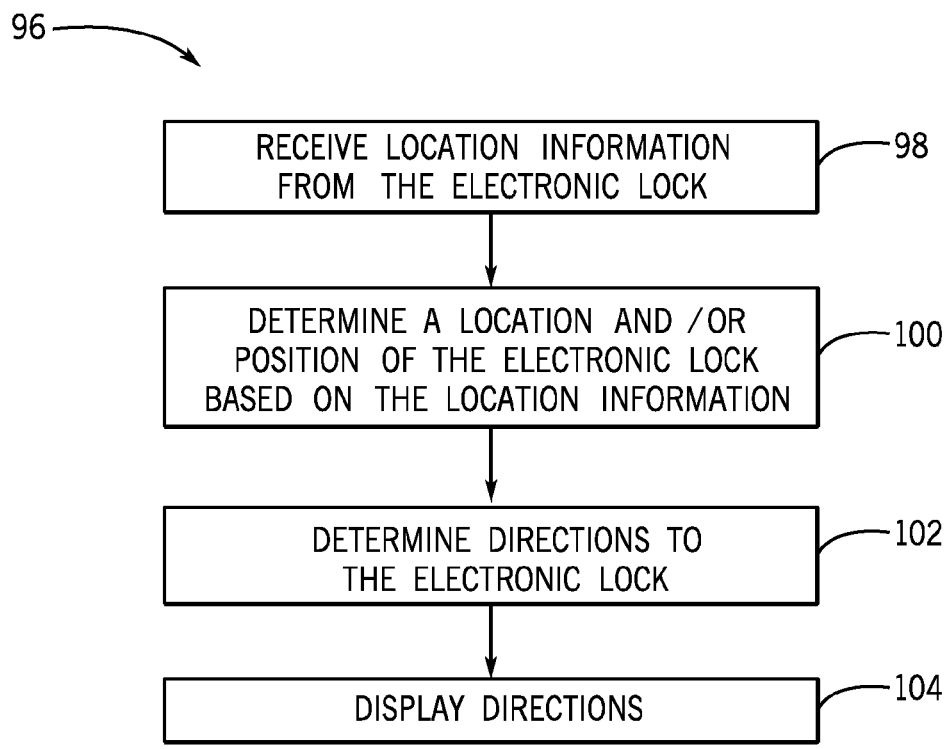
FIG. 10 is a flow diagram of a method for using location information from the electronic lock of FIG. 6 to determine directions to the electronic lock, in accordance with embodiments presented herein.

FIG. 10 is a flow diagram of a method 96 for using location information from the electronic lock 29 of FIG. 4 to determine directions to the electronic lock 29, in accordance with embodiments presented herein. Although the following description of the method 96 is described with reference to the processor 36 of the computing device 26, it should be noted that the method 96 may be performed by other processors disposed on other devices that may be capable of communicating with the electronic lock 29, such as the cloud-based computing system 28, the industrial automation equipment 16, the control/monitoring device 14, or other components associated with the industrial application 24. Additionally, although the following method 96 describes a number of operations that may be performed, it should be noted that the method 96 may be performed in a variety of suitable orders and all of the operations may not be performed. It should be appreciated that the method 96 may be wholly executed by the computing device 26 or the execution may be distributed between the computing device 26 and/or the cloud-based computing system 28.

Referring now to the method 96, the processor 36 may receive (block 98) location information from the electronic lock 29. The location information may be sent from the communication component 50, such as a beacon, and the location information may indicate the location and/or position of the electronic lock 29 on the industrial automation equipment 16. The processor 36 may determine (block 100) the location and/or position of the electronic lock 29 based on the location information. Further, the processor 36 may determine (block 102) navigational directions to the electronic lock 29. In some embodiments, the directions may begin from the location of the computing device 26 and end at the location of the electronic lock 29. The processor 36 may display (block 104) the directions on the display 42. As such, the computing device 26 may enable easily locating, servicing, and/or replacing the electronic lock 29 when desired.

It should be noted that the methods 82 and 90 are performed using the processor 52 that is part of the electronic lock 29 and the methods 72 and 96 are performed by the processor 36 of the computing device 26. The electronic lock 29 and the computing device 26 are configured to execute instructions that enable each device to interact with the industrial automation equipment 16. As such, the electronic lock 29 and the computing device 26 are tied to particular machines to assist in the management and operations of the industrial automation equipment 16, and thus, the industrial application 24. Moreover, it should be noted that the data received by the electronic lock 29, the computing device 26, the cloud-based computing system 28, the industrial automation equipment 16, or the control/monitoring device 14 may be transformed when being transmitted, analyzed, or depicted for view by a user of the respective device. For example, the tampering alert generated based on signals received from the sensors 56 and/or image/video data received from camera 66 includes a transformation of the sensor data signals and/or image/video data to the alert. Also, the directions generated based on the location data from the electronic lock 29 include a transformation of the location information to navigational directions. Further, the actuation signal generated by the computing device 26 after multi-factor authentication enables controlling the industrial automation equipment 16.

Figure 11:
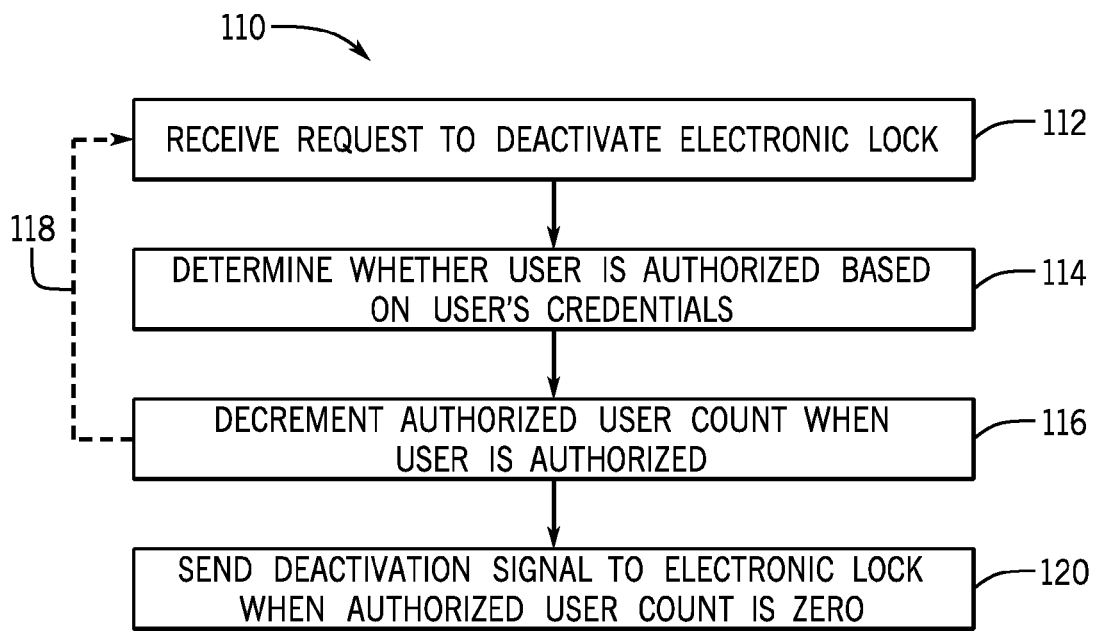
FIG. 11 is a flow diagram of a method for controlling deactivation of the electronic lock of FIG. 6, in accordance with embodiments presented herein.

FIG. 11 is a flow diagram of a method 110 for controlling deactivation of the electronic lock 29 of FIG. 6, in accordance with embodiments presented herein. Although the following description of the method 110 is described with reference to the processor 36 of the computing device 26, it should be noted that the method 110 may be performed by other processors disposed on other devices that may be capable of communicating with the electronic lock 29, such as the cloud-based computing system 28, the industrial automation equipment 16, the control/monitoring device 14, or other components associated with the industrial application 24. For example, in some embodiments, the method 110 may be performed by the lock processor 52. Additionally, although the following method 110 describes a number of operations that may be performed, it should be noted that the method 110 may be performed in a variety of suitable orders and all of the operations may not be performed. It should be appreciated that the method 110 may be wholly executed by the computing device 26 or the execution may be distributed between the computing device 26 and/or the cloud-based computing system 28.

Referring now to the method 110, the processor 36 may receive (block 112) a request to deactivate (e.g., unlock) the locking mechanism 64 of the electronic lock 29 that is currently in a locked state (e.g., preventing the industrial automation equipment 16 from being operational). The request may be received as input from the user, as a signal from the industrial automation equipment 16, the electronic lock 29, the control/monitoring device 14, the cloud-based computing system 28, other industrial automation equipment located in the facility, or the like. The processor 36 may determine (block 114) whether the user associated with the request is authorized to place the industrial automation equipment 16 online based on credentials of the user. For example, the processor 36 may prompt the user to enter an employee identification number, a username, or the like and an associated password, and then verify the credentials in a database to determine the access rights associated with the credentials. In some embodiments, the processor 36 may use single sign-on (SSO) and already possess the credentials from when the user entered them by initially logging into the software. Also, the processor 36 may have remembered the credentials of the user, thereby skipping over prompting the user for the credentials. If the credentials of the user do not have sufficient access rights to place the industrial automation equipment 16 online, then the processor 36 may deny the request and not decrement the authorized user count, discussed above in FIG. 7.

When the credentials of the user have sufficient access rights to place the industrial automation equipment 16 online, then the processor 36 may decrement (block 116) the authorized user count. In some embodiments, the processor 36 may check the actuation state (e.g., locked or unlocked) of the locking mechanism 64 before decrementing the authorized user count. In some embodiments, the processor 36 may not send a deactivation signal until the authorized user count reaches a desired value (e.g., zero). Thus, the processor 36 may receive additional requests to deactivate the electronic lock 29 (shown by dotted line 118) until the authorized user count is decremented to zero. To illustrate, if the authorized user count is set to three, then three requests to deactivate the electronic lock 29 may cause the authorized user count to be decremented to zero. As a result, the processor 36 may send (block 120) a deactivation signal to the electronic lock 29 when the authorized user count is zero.

Technical effects of the embodiments described herein include using an electronic lock 29 that enables virtually tagging and locking industrial automation equipment 16 from a connected device, such as the computing device 26. The software running on the computing device 26 may generate an actuation signal after certain credential and/or status checks are performed. Also, information related to the user who operates the electronic lock 29 and the time at which the lock 29 was operated may be logged (e.g., virtually tagged) by the electronic lock 29. Also, the electronic lock 29 may provide location information to the computing device 26 so the computing device 26 may locate and/or provide directions to the electronic lock 29. Further, the electronic lock 29 may determine when it is being tampered with and perform one or more preventative actions. In addition, displaying tagging information (e.g., identity of technician responsible for locking the electronic lock 29, timestamp of locking the electronic lock 29) using the display 57 on the electronic lock 29 avoids the use of traditional physical tags. Although the above system and techniques are described with regard to the industrial application 24, it should be understood that the system and techniques may apply to any industry, such as pharmaceutical, oil and gas, food and beverage, and so forth.

In the preceding specification, various embodiments have been described with reference to the accompanying drawings. It will, however, be evident that various modifications and changes may be made thereto, and additional embodiments may be implemented, without departing from the broader scope of the present disclosure as set forth in the claims that follow. The specification and drawings are accordingly to be regarded in an illustrative rather than restrictive sense.

The invention claimed is:

1. A non-transitory computer readable medium comprising computer-executable instructions that, when executed by a processor, are configured to cause the processor to:
   receive a first set of data associated with a user;
   receive a second set of data associated with one or more lockout procedures performed by the user;
   receive a request to actuate a locking mechanism of an electronic lock configured to prevent a machine in an industrial automation application from being operational; and
   send a signal to the electronic lock to actuate the locking mechanism when the second set of data indicates that the lockout procedures have been performed by the user and the data corresponds to an authorized user.

2. The computer readable medium of claim 1, wherein the instructions, when executed by the processor, are configured to cause the processor to not send the signal when the lockout procedures have not been performed or the data does not correspond to the authorized user.

3. The computer readable medium of claim 1, wherein the instructions, when executed by the processor, are configured to cause the processor to receive location information from the electronic lock and determine a location, a position, or both the location and the position of the electronic lock based on the location information.

4. The computer readable medium of claim 1, wherein the instructions, when executed by the processor, are configured to cause the processor to:
- receive an additional request to actuate the locking mechanism of the electronic lock from an authorized user; and
- increment an authorized user count when the locking mechanism is already locked.

5. The computer readable medium of claim 1, wherein the computer instructions, when executed by the processor, are configured to cause the processor to:
- receive a request from an authorized user to deactivate the locking mechanism of the electronic lock when the locking mechanism is locked;
- decrement an authorized user count; and
- send a signal to the electronic lock to deactivate the locking mechanism when the authorized user count is zero.

6. The computer readable medium of claim 3, wherein the instructions, when executed by the processor, are configured to cause the processor to:
- determine navigational directions to the electronic lock based on the location; and
- display the navigational directions on a display.

7. The computer readable medium of claim 1, wherein the instructions, when executed by the processor, are configured to cause the processor to send a request for log data to the electronic lock, wherein the log data comprises:
- a record of times when the electronic lock has been locked and unlocked;
- one or more identities of one or more users associated with operating the electronic lock for each respective time; or
- both.

8. The computer readable medium of claim 1, wherein the instructions, when executed by the processor, are configured to cause the processor to enable certain functionalities on a graphical user interface when the lockout procedures are performed by the user and the data corresponds to the authorized user.

9. The computer readable medium of claim 1, wherein the instructions, when executed by the processor, are configured to cause the processor to wirelessly communicate directly with the electronic lock.

10. The computer readable medium of claim 1, wherein the instructions, when executed by the processor, are configured to cause the processor to disable one or more functionalities of a graphical user interface when the lockout procedures are not performed by the user or the data does not correspond to the authorized user.

11. A system, comprising:
- an electronic lock, comprising:
  - a first processor configured to receive an actuation signal;
  - a power source; and
  - a locking mechanism configured to physically lock out a machine from being operational; and
- a computing device comprising a second processor configured to send the actuation signal to the electronic lock, wherein the actuation signal is configured to cause the locking mechanism to actuate when one or more access rights associated with the electronic lock correspond to one or more credentials of a user and one or more steps of a lockout-tagout procedure have been performed.

12. The system of claim 11, wherein the electronic lock comprises a display configured to display information using electronic ink.

13. The system of claim 12, wherein the first processor is configured to cause the power source to supply current to a magnet to attract or repel an adjustable cable to lock or unlock the locking mechanism.

14. The system of claim 11, wherein the power source comprises a pre-charged battery, a rechargeable battery, an energy-harvesting device, a continuous power source, or some combination thereof.

15. The system of claim 14, wherein the energy-harvesting device is configured to convert motion, ambient light, thermal differences, or some combination thereof into electrical energy.

16. The system of claim 11, wherein the first processor is configured to store a record of times when the electronic lock is locked and unlocked, determine a user who operated the electronic lock at the respective times, and store an identity of the user.

17. The system of claim 11, wherein the electronic lock comprises a radio-frequency identification reader configured to receive a radio-frequency identification tag associated with a user that is operating the electronic lock.

18. The system of claim 11, wherein the first processor is configured to determine whether the electronic lock is subject to tampering and perform one or more actions when the electronic lock is subject to tampering, wherein the one or more actions comprise sending one or more signals to shut down the machine or another machine in a facility having the machine and the another machine, send an alert notification to the computing device, trigger an alarm of the electronic lock, or some combination thereof.

19. The system of claim 11, wherein the electronic lock comprises a display that is configured to display information related to an identity of the user and a timestamp at which the electronic lock is actuated.

20. An electronic lock configured to physically lock out a machine from being operational, comprising:
- a locking mechanism;
- a processor configured to perform an action when the electronic lock is subject to tampering;
- a transceiver configured to receive an actuation signal configured to actuate the locking mechanism and to send data associated with the locking mechanism to a cloud-based computing system; and
- a memory configured store the data associated with the locking mechanism.

21. The electronic lock of claim 20, wherein the data associated with the locking mechanism comprises a record of one or more times when the locking mechanism was locked and unlocked, one or more identities of users that operated the locking mechanism, or both.

22. The electronic lock of claim 20, wherein the actuation signal is sent from a processor of a computing device when the processor determines that one or more steps of a lockout-tagout procedure have been performed and a user requesting to lock the electronic lock is an authorized user.

* * * * *